United States Patent [19]

Weiss et al.

[11] 3,837,609
[45] Sept. 24, 1974

[54] SUPPORT BRACKET FOR RAILS AND THE LIKE

[75] Inventors: Morton A. Weiss, Springfield; Bernard S. Speckhart, Short Hills, both of N.J.

[73] Assignee: White Machine Co., Kenilworth, N.J.

[22] Filed: Sept. 18, 1972

[21] Appl. No.: 290,023

[52] U.S. Cl. .............................. 248/317, 104/111
[51] Int. Cl. ............................................ E01b 25/22
[58] Field of Search .......... 248/317, 323, 327, 340, 248/343, 214, 300; 52/484; 104/115, 111

[56] References Cited
UNITED STATES PATENTS

| | | | |
|---|---|---|---|
| 618,603 | 1/1899 | Henneman | 248/59 |
| 826,605 | 7/1906 | Pflum et al. | 104/111 |
| 2,706,306 | 4/1955 | Sheetz | 248/317 X |
| 2,915,275 | 12/1959 | Karka | 248/327 |

Primary Examiner—J. Franklin Foss
Attorney, Agent, or Firm—Thomas Cifelli, Jr.

[57] ABSTRACT

A rail support bracket is formed from a stamping of a single sheet of metal. One end of the sheet is bent to form a "U" shaped attaching head for fastening the bracket to various support members. Two axially aligned holes can be formed in the arms of the U shaped attaching head to receive a suspension pipe to which the bracket is to be attached. A single jam screw is threadably engaged in the third side of the attaching head of the support bracket to bear against the suspension pipe to force the pipe against holes in the attaching head in order to lock the bracket in place. The other end of the sheet is bent to form a rail support cradle for attachment of rails to the bracket. Other embodiments of the bracket enable connection of the attaching head to common structural members, such as angle irons, channels or flat surfaces.

10 Claims, 9 Drawing Figures

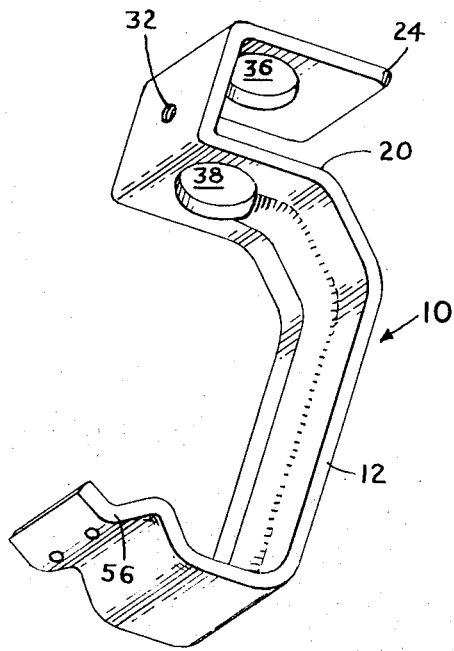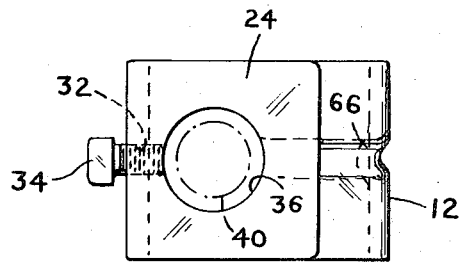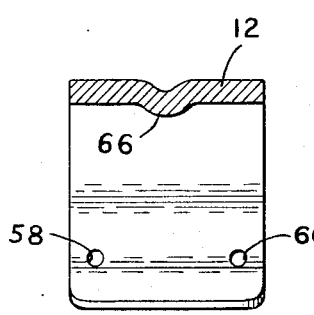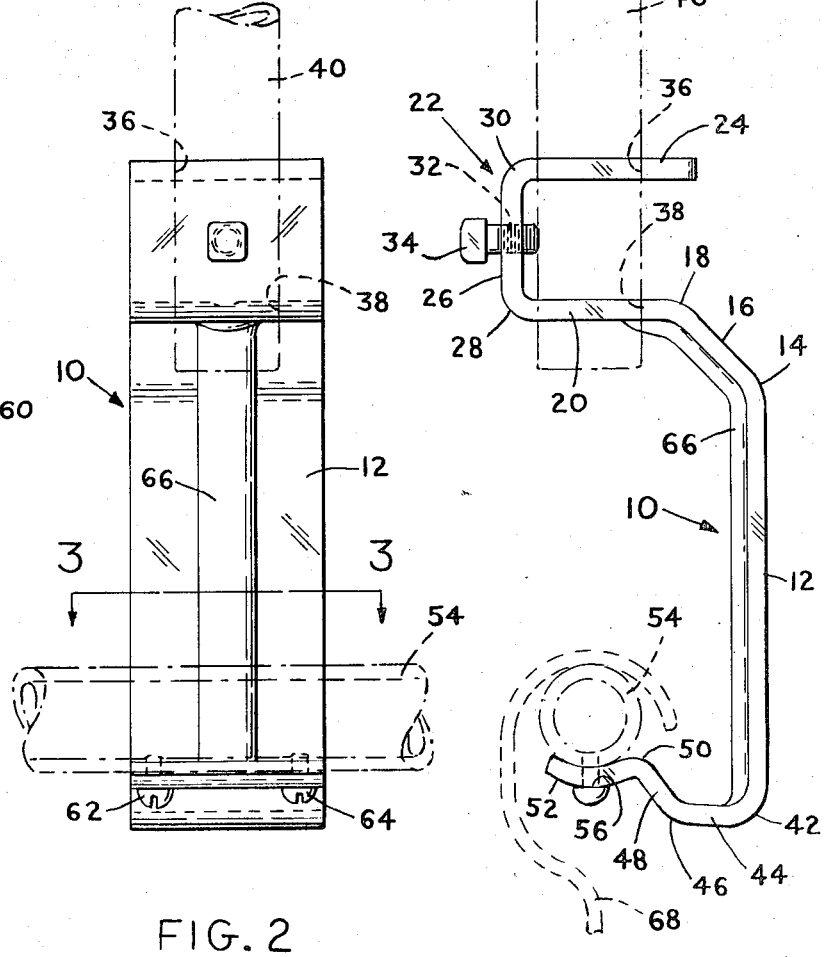
FIG. 1
FIG. 5
FIG. 3
FIG. 2
FIG. 4

SUPPORT BRACKET FOR RAILS AND THE LIKE

BACKGROUND OF THE INVENTION

1. Field of the Invention

This invention relates to overhead rail systems and, more particularly, to the brackets used for supporting such systems.

2. Description of the Prior Art:

In construction of overhead rail systems used in industrial plants, retail establishments, and other locations, the overhead horizontal railings are suspended from the ceiling by means of support brackets fastened to suspension pipes extended downwardly from the ceiling. The rail support brackets have previously been made of castings of malleable iron which included two coacting arms, each having a semicircular portion, which form a collar about the suspension pipe extending from the ceiling. The arms of the collar were tightened about the suspension pipe by tightening a bolt passing through both arms of the collar.

These brackets often proved difficult to install because the cast arms forming the collar were, of necessity, relatively inflexible and, therefore, had only a limited range of adjustment. This small range of adjustment was all the more troublesome because in order to economically produce these brackets, it was necessary to use relatively unsophisticated casting techniques which could not closely control the dimensional tolerances of the articles produced. Therefore, it was difficult for these collars to accommodate to situations where the diameter of the collar was greater than the diameter of the suspension pipe. Further, it was even more difficult to fit these brackets to the suspension pipe when either the suspension pipe was too large or the collar was too small. In such instances, it was necessary to pry apart the arms of the bracket collar, a time-consuming task, and one which very often damaged the bracket beyond use.

Additionally, due to the unsophisticated casting techniques dictated in the manufacture of these brackets, the material in each of the castings was less than uniform and the uniformity of material from one bracket to another also varied. Further, the cast rail support brackets were, of necessity, relatively heavy and, therefore, provided difficulties in their handling and installation.

SUMMARY OF THE INVENTION:

To overcome the problems inherent in the prior art, the present invention sets forth a rail support bracket which is formed from a stamping of a single sheet of metal. One end of the sheet is bent to form a U shaped attaching head for fastening the bracket to various support members. Two axially aligned holes can be formed in the arms of the U shaped attaching head to receive a suspension pipe to which the bracket is to be attached. A single jam screw is threadably engaged in the third side of the attaching head of the support bracket to bear against the suspension pipe to force the pipe against holes in the attaching head in order to lock the bracket in place. The other end of the sheet is bent to form a rail support cradle for attachment of rails to the bracket. Other embodiments of the bracket enable connection of the attaching head to common structural members, such as angle irons, channels or flat surfaces.

Accordingly, in view of the above, it is an object of the present invention to provide a support bracket for rails and the like which can easily be fastened to suspension pipes and the like.

Another object of the present invention is to provide a support bracket for rails and the like which can easily be adjusted to fit a wide size of suspension pipes and the like.

Yet another object of the present invention is to provide a support bracket for rails and the like which can be tightened to suspension pipes and the like by turning only a single screw.

It is another object of the present invention to provide a support bracket for rails and the like which can be connected to and supported by a wide variety of structural members, such as angle irons, channels, columns, etc.

It is still another object of the present invention to provide a support bracket for rails and the like which is of lighter weight and relatively high strength to weight than those previously available.

A further object of the present invention is to provide a support bracket for rails and the like which is uniform in dimensions and material properties.

It is an additional object of the present invention to provide a support bracket for rails and the like which is not made from a cast construction.

Another object of the present invention is to provide a support bracket for rails and the like which is relatively cheaper to fabricate.

It is still a further object of the present invention to provide a support bracket for rails and the like in which almost all fabricating operations are performed by stamping a single sheet of material.

Yet a further object of the present invention is to provide a support bracket for rails and the like which is fabricated with a minimum of precision manufacturing steps required.

Another object of the present invention is to provide a support bracket for rails and the like which has greater stability with respect to the suspension pipe or the like to which it is attached because of the relatively large span between the points at which the bracket contacts the pipe.

Other objects and advantages will be apparent from the following description of several embodiments of the invention, and the novel features will be particularly pointed out hereinafter in connection with the appended claims.

BRIEF DESCRIPTION OF THE DRAWINGS:

FIG. 1 is a perspective view of a bracket built in accordance with the teachings of the present invention.

FIG. 2 is a front view of the bracket shown in FIG. 1, with the bracket mounted to a suspension pipe and supporting a horizontal railing.

FIG. 3 is a view taken along line 3—3 of FIG. 2.

FIG. 4 is a side view of FIG. 2.

FIG. 5 is a top view of FIG. 4.

Figure 6:
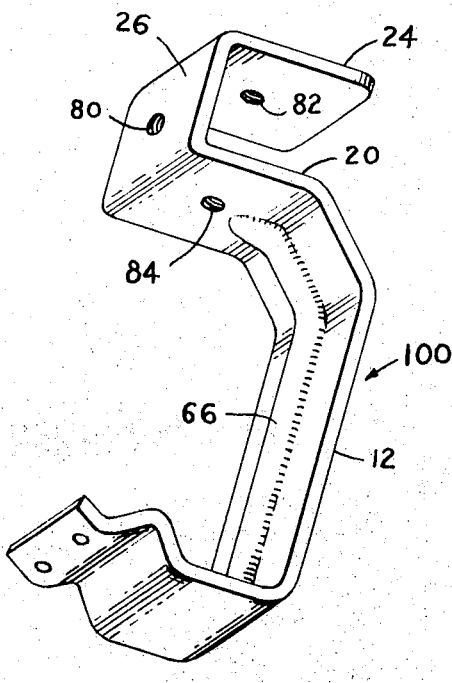
FIG. 6 is a perspective view of another embodiment of a bracket built in accordance with the teachings of the present invention.

DESCRIPTION OF PREFERRED EMBODIMENTS:

As shown in the figures of the drawings, the rail support bracket, generally indicated at 10, is made from a single sheet of metal which is stamped to form the bracket. The bracket consists of a web section 12, which has a bend 14 of approximatley 45° at its upper end to form a shoulder 16 which, in turn, has a bend 18 of approximately 45° at its upper end which then leads to a lower arm 20 of a U-shaped attaching head, generally indicated at 22. In addition to the lower arm 20, the attaching head has an upper arm 24 and a mid section 26 which connects the two arms. Bends 28 and 30 connect the lower arm to the mid section and the mid section to the upper arm respectively. Mid section 26 includes a threaded passage 32 in which a jam screw 34 is threadably engaged, the purpose of which will be explained in detail below.

Holes 36 and 38 are stamped in upper arm 24 and lower arm 20 respectively and are axially aligned to accommodate the suspension pipe shown in dashed lines at 40, to which the bracket is fastened. The holes 36 and 38 in the upper and lower arms of the attaching head are made larger than the suspension pipe, so that the suspension pipe can easily fit into the attaching head 22. By threading the jam screw 34 into the threaded passage 32, the end of the jam screw will bear against the suspension pipe 40, forcing the pipe against the holes 36 and 38 to thereby fix the support bracket to the suspension pipe.

The bottom of web 12 has a 90° bend 42 which forms the sheet into a foot 44. The foot itself has a 45° bend 46, which forms the sheet into an elbow 48, which is then bent at bend 50 into a rail cradle 52, or mounting flange, for the rail, shown in dashed lines as 54. A bend 56 in the middle of rail cradle 52 enables the rail cradle to conform to the shape of the rail and to properly position the rail with relation to the suspension pipe. As shown in FIGS. 1 and 3, screw passages 58 and 60 are formed in the rail cradle, through which screws 62 and 64 pass and are threadably engaged to the rail 54 to securely fasten the rail to the rail support bracket.

A strengthening rib 66, formed by a stamping operation on the web, extends from the end of the lower arm 20 adjacent the web shoulder 16 to the bottom of the web 12. Though this strengthening rib substantially increases the strength of the rib, it is not a critical feature to the functioning of the device.

As mentioned above, the bracket is quickly and easily installed to the suspension pipe by merely slipping the axial aligned holes 36 and 38 in the upper and lower arms 24 and 22 respectively of the attaching head over the suspension pipe 40 and then tightening the jam screw 34 to force the pipe against the holes 36 and 38. After the support bracket has been fastened to the suspension pipe, the railing can be connected to the rail cradle 52 by means of the screws 62 and 64. Once the railing is connected, various items can be hung from the railing by means of hangers, as shown by dotted lines 68 in FIG. 4 or by any other convenient means. Note that foot 44 provides clearance for hanger 68 between the rail 54 and the strengthening rib 66 of web 12.

It should be pointed out that the distance between the upper arm and the lower arm provided by the mid section 26 of the attaching head 22 gives a great deal of stability to the connection of the support bracket with the suspension pipe, since the contact points between the suspension pipe 40 and the holes 36 and 38 respectively in the upper and lower arms are a substantial distance apart, thereby eliminating wobble of the bracket with respect to the suspension pipe.

It should also be noted that the entire bracket is made from a single sheet of metal, with only one machining operation of any precision required, that being the threading the threaded passage 32 in the mid section 26 to accommodate the jam screw 34. Almost all other fabricating operations can be accomplished by stamping.

The weight of the bracket is relatively light because of the stamped construction and this greatly facilitates the handling of the bracket during the installation. Additionally, by making the holes in the upper and lower arms of the attaching head realtively larger than the anticipated size of the suspension pipe, the bracket can accommodate a wide range of suspension pipes simply by adjusting the jam screw used to force the pipe against the holes in the upper and lower arms of the attaching head.

The bracket can be made in other forms, as depicted by the embodiment of the invention shown in FIGS. 6 through 9. The bracket can be made with relatively minor modifications to enable it to be mounted to a wide variety of structural members, such as angle irons, channels, box beams, columns, etc. For purposes of simplicity, the same elements appearing in all embodiments will be similarly numbered.

In FIG. 6, the bracket generally indicated as 100, has a U shaped attaching head 22 with three threaded passages formed in the arms and mid section; passage 84 formed in lower arm 20; 80 formed in mid section 26; and 82 in upper arm 24. The threaded passages enable the bracket to be fastened either horizontally through the mid section or vertically through either or both of the arms 20 and 24 to the fastening head, thereby providing a very flexible method of mounting the supporting bracket to any structural member.

Figure 7:
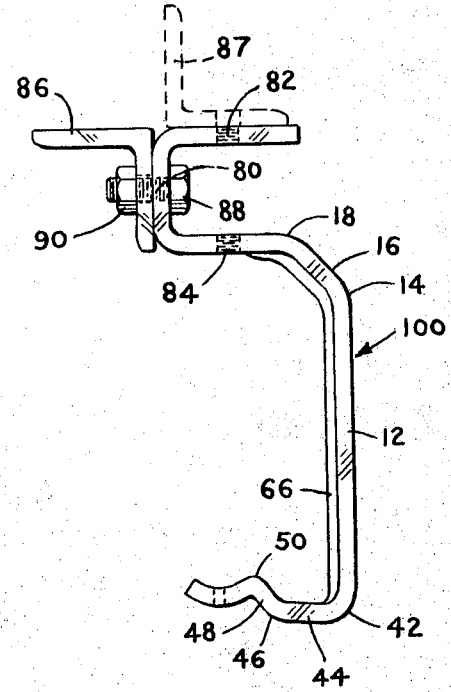
FIG. 7 shows the bracket of FIG. 6 with a horizontal fastening to an angle iron structural member.

As shown in FIG. 7, the supporting bracket 100 can be mounted horizontally to an angle iron 86 by passing a bolt 88 through passage 80 in mid section 26 of the attaching head 22 of the bracket and then through a passage in the angle iron 86. A lock nut 90 is then fastened to the bolt to secure the bracket to the channel. The bracket could also be vertically fastened to an angle iron 87, as shown in phantom lines of FIG. 7.

Figure 8:
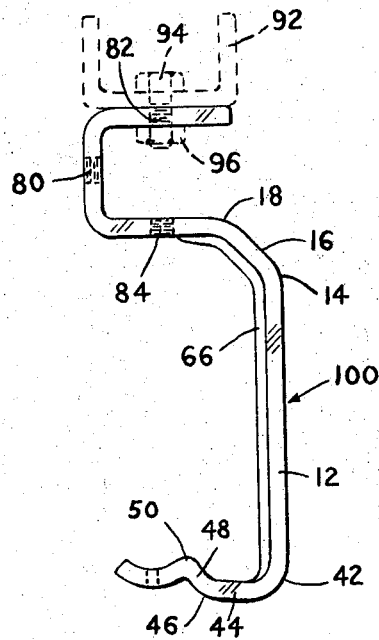
FIG. 8 shows the bracket of FIG. 6 vertically fastened to a channel structural member.

FIG. 8 shows the bracket mounted to a channel 92 by means of a bolt 94 fastened vertically through a passage in the channel and through the hole 82 in the upper arm 24 of the attaching head. A nut 96 is then fastened to the bolt to secure the channel.

Figure 9:
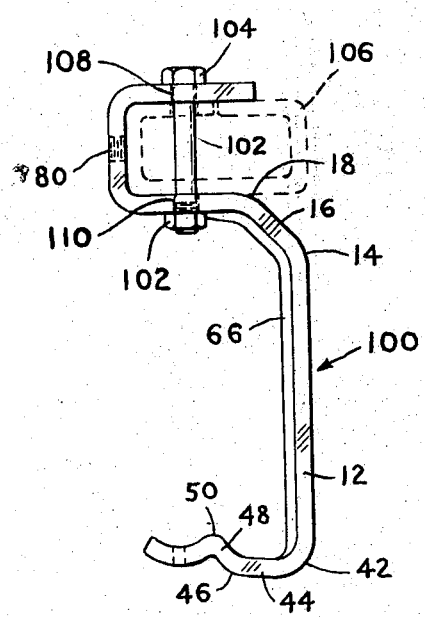
FIG. 9 shows the bracket of FIG. 6 mounted upon and vertically fastened to a box beam type structural member.

The bracket can also be mounted on top of supporting members or around supporting members, as shown in FIG. 9, where a box beam 106 is placed between the upper and lower arms 24 and 20 respectively of the attaching head 22 and a bolt 104 is passed through passage 108 in the upper arm 24 of the attaching head, through the walls of the box beam, through passage 110 in lower arms 20 of the attaching head, and then fastened by means of a nut 102 attached to the threaded end of the bolt.

In discussing the second embodiment of the invention, of course, it should be pointed out that any number of holes can be formed in the arms or mid section of the attaching head for the purpose of fastening the bracket to a support member. Similarly, these holes in the attaching head can be either threaded or unthreaded, depending upon the instructions of the user of the bracket and how he intends to install the bracket.

It will be understood that various changes in the details, materials and arrangements of parts which have been herein described and illustrated in order to explain the nature of the invention may be made by those skilled in the art within the principle and scope of the invention, as expressed in the appended claims.

What is claimed is:

1. A supporting bracket for rails and the like comprising:
   a. a stamping of a single sheet of metal,
   b. a plurality of bends near one end of the sheet of metal forming the sheet into a web portion and a U-shaped attaching head portion having two arms and a mid section;
   c. fastening passage means formed in the U-shaped attaching head adapted for securely and rigidly fixing the bracket to a variety of rigid supporting members;
      1. at least one of said fastening passage means being formed in at least one of the two arms or the mid section of the U-shaped attaching head; and
   d. at least one bend near the other end of the sheet of metal to form a rail cradle adapted to accommodate a railing to be supported by the bracket wherein the fastening passage means the U-shaped attaching head comprise:
      a single, substantially circular hole in each of the arms of the U-shaped attaching head adapted to receive a pipe to which the bracket is to be fixed; and
      a third circular hole in the mid section of the U-shaped attaching head having jam means threadably engaged therein for securely and rigidly forcing the bracket into fixed engagement with the pipe.

2. The supporting bracket for rails and the like according to claim 1 wherein the holes in the arms of the U-shaped attaching head are in axial alignment.

3. The supporting bracket for rails and the like according to claim 2 wherein the fastening passage means to securely and rigidly fix the bracket to the pipe includes:
   a threaded passage means in the mid section of the U-shaped attaching head; and
   a jam screw threadably engaged in the threaded passage adapted to bear against the pipe extending into the holes in the arms of the U-shaped attaching head to force the pipe against the holes of the U-shaped attaching head and securely and rigidly fix the U-shaped attaching head to the pipe.

4. The supporting bracket for rails and the like according to claim 3 wherein the rail cradle includes at least one passage adapted to receive a screw to fasten a rail to the rail cradle.

5. The supporting bracket for rails and the like according to claim 1 further comprising a bend in the web portion forming a strengthening rib extending the length of the web portion.

6. The supporting bracket for rails and the like according to claim 5 wherein the web portion includes a shoulder section formed by a bend in the web portion extending approximately 45° to the web portion and connecting the web portion to one of the arms of the U-shaped attaching head by means of a second 45° bend.

7. The supporting bracket for rails and the like according to claim 6 wherein the web portion is connected to the rail cradle by means of a foot section formed at a 90° bend at the end of the web portion opposite the shoulder section of the web portion.

8. The supporting bracket for rails and the like according to claim 3 wherein the web portion includes a shoulder section formed by a bend in the web portion extending approximately 45° to the web portion and connecting the web portion to one of the arms of the U-shaped attaching head by means of a second 45° bend.

9. The supporting bracket for rails and the like according to claim 8 wherein the web portion is connected to the rail cradle by means of a foot section formed at a 90° bend at the end of the web portion opposite the shoulder section of the web portion.

10. The supporting bracket for rails and the like according to claim 9 wherein the rail cradle includes at least one passage adapted to receive a screw to fasten a rail to the rail cradle.

* * * * *